United States Patent
Castle et al.

(10) Patent No.: US 10,388,182 B2
(45) Date of Patent: Aug. 20, 2019

(54) SOCIALLY ENABLED GUIDANCE FOR PRODUCTS WITH GUIS

(71) Applicant: International Business Machines Corporation, Armonk, NY (US)

(72) Inventors: Mark A. Castle, Winchester (GB); Andrew D. Humphreys, Hampshire (GB); Martin G. Keen, Cary, NC (US); John J. P. McNamara, Winchester (GB); Mark N. Walters, Witney (GB)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 14/549,019

(22) Filed: Nov. 20, 2014

(65) Prior Publication Data
US 2016/0147397 A1    May 26, 2016

(51) Int. Cl.
*G09B 19/00* (2006.01)

(52) U.S. Cl.
CPC .................................. *G09B 19/0053* (2013.01)

(58) Field of Classification Search
CPC .. G06F 3/0484; G06F 3/0482; G09B 19/0053
See application file for complete search history.

(56) References Cited

U.S. PATENT DOCUMENTS

| | | | |
|---|---|---|---|
| 8,073,714 B1* | 12/2011 | Ball | G06Q 10/10 705/35 |
| 8,555,253 B2 | 10/2013 | Shufer et al. | |
| 8,612,806 B2 | 12/2013 | Rossi | |
| 2003/0043991 A1* | 3/2003 | Kriechbaum | H04M 3/493 379/218.01 |
| 2004/0255270 A1* | 12/2004 | McGlinchey | G06F 9/4446 717/109 |
| 2006/0053372 A1* | 3/2006 | Adkins | G09B 7/02 715/709 |
| 2006/0184888 A1* | 8/2006 | Bala | G06F 9/4446 715/762 |
| 2010/0205530 A1 | 8/2010 | Butin et al. | |

* cited by examiner

*Primary Examiner* — Jennifer N To
*Assistant Examiner* — Ashley M Fortino
(74) *Attorney, Agent, or Firm* — Daniel Simek; Hoffman Warnick LLC (57) ABSTRACT

The disclosure is directed to socially enabled guidance for products with GUIs. A method in accordance with an embodiment includes: recording a set of sequential graphical user interface (GUI) interactions in a product GUI; saving the set of sequential GUI interactions in a file; importing the file containing the set of sequential GUI interactions; parsing the file to extract the set of sequential GUI interactions; highlighting a GUI interaction listed in the set of sequential GUI interactions; and in response to a user selection of the highlighted GUI interaction, highlighting a next GUI interaction listed in the set of sequential GUI interactions.

10 Claims, 5 Drawing Sheets

SOCIALLY ENABLED GUIDANCE FOR PRODUCTS WITH GUIS

TECHNICAL FIELD

The present disclosure relates generally to graphical user interfaces (GUIs), and more particularly, to socially enabled guidance for products with GUIs.

RELATED ART

GUI rich software products are becoming more and more sophisticated, while often, due to resource constraints, the users of these products are becoming less and less skilled, with restricted access to expensive educational sessions and limited time to become familiar with the products. This can often result in a number of negative consequences. For example, time to value of the product is often greater than optimal, as the user struggles to master the technology of the product and the use of the product GUI. Further, users often have a perception that a product is overly complex and error prone, which results in poor customer satisfaction. This may lead to unnecessary calls to software support teams regarding avoidable user errors, resulting in customer frustration and wasted time and resources for the support teams.

Social sharing of best practices for software products is difficult as the methods for sharing expertise are restricted to written tutorials or video, both of which can be costly to create, lengthy, and require the user to remember the content of the written tutorial or video before and while using the software product. Written tutorials often comprise many steps and instructions and are prone to user error. Written tutorial also require the user to 'parse' the steps and translate them to the product. Video is also used and, although often better than documentation, is costly to produce and can be resource intensive (e.g., hundreds of MB for a tutorial). Further, the user still needs to repeatedly refer to the video, then back to the product, resulting in a loss of context and a reduction in ease of use.

SUMMARY

A first aspect of the disclosure provides a method, comprising: recording a set of sequential graphical user interface (GUI) interactions in a product GUI; saving the set of sequential GUI interactions in a file; importing the file containing the set of sequential GUI interactions; parsing the file to extract the set of sequential GUI interactions; highlighting a GUI interaction listed in the set of sequential GUI interactions; and in response to a user selection of the highlighted GUI interaction, highlighting a next GUI interaction listed in the set of sequential GUI interactions.

A second aspect of the disclosure provides a computer program product comprising program code embodied in at least one computer-readable storage medium, which when executed, enables a computer system to implement a method, the method comprising: recording a set of sequential graphical user interface (GUI) interactions in a product GUI; saving the set of sequential GUI interactions in a file; importing the file containing the set of sequential GUI interactions; parsing the file to extract the set of sequential GUI interactions; highlighting a GUI interaction listed in the set of sequential GUI interactions; and in response to a user selection of the highlighted GUI interaction, highlighting a next GUI interaction listed in the set of sequential GUI interactions.

A third aspect of the disclosure provides a computer system for performing a method, the method comprising: recording a set of sequential graphical user interface (GUI) interactions in a product GUI; saving the set of sequential GUI interactions in a file; importing the file containing the set of sequential GUI interactions; parsing the file to extract the set of sequential GUI interactions; highlighting a GUI interaction listed in the set of sequential GUI interactions; and in response to a user selection of the highlighted GUI interaction, highlighting a next GUI interaction listed in the set of sequential GUI interactions.

Other aspects of the disclosure provide methods, systems, program products, and methods of using and generating each, which include and/or implement some or all of the actions described herein. The illustrative aspects of the disclosure are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

The disclosure relates generally to graphical user interfaces (GUIs), and more particularly, to socially enabled guidance for products with GUIs. According to embodiments, the user of a product GUI is provided with a defined set of context-based instructions directly within the product GUI itself. The set of instructions directs the user to the next steps they should perform in the product GUI to achieve a specific goal. The set of instructions may be provided and shared via social media, user groups, expert groups, and/or the like. To this extent, users can avoid having to follow video based instructions or read lengthy, hard to understand written instructions.

According to embodiments, a user may create a set of sharable context-based instructions in a product GUI which are machine readable and will allow the recipients of the instructions to follow the instructions in the same context in which they were created (i.e. in the product GUI). This may be useful in sharing best practice approaches to sophisticated implementations, for example a highly available cluster within IBM WebSphere MQ.

Figure 1:
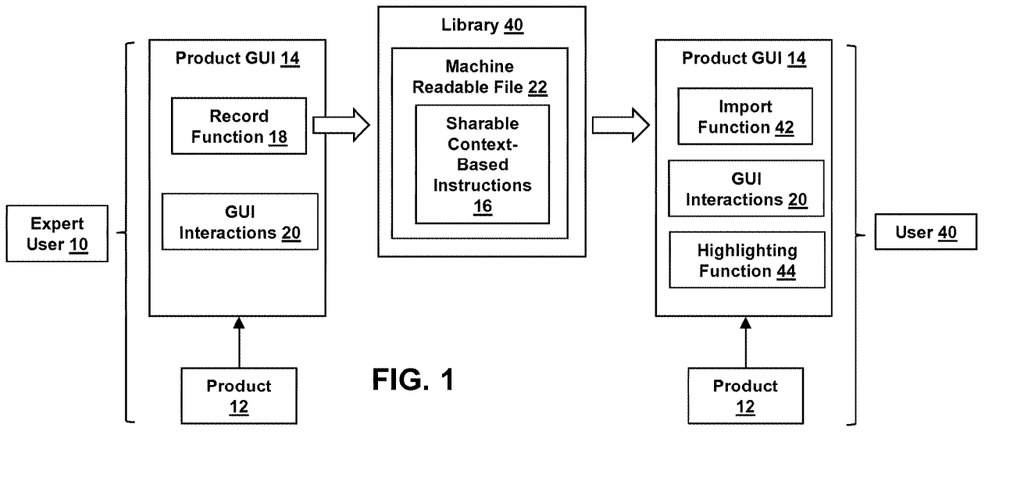
FIG. 1 depicts a system for socially enabled guidance for products with GUIs, according to embodiments.

An illustrative system for socially enabled guidance for products with GUIs in accordance with embodiments is depicted in FIG. 1. In this example, an experienced user 10, who is experienced in using a product 12 and a corresponding product GUI 14 for the product 12, begins a process of creating a set of sharable context-based instructions 16. Initially, the experienced user 10 selects a 'record' function 18 in the product GUI 14. The record function 18 may be presented as a menu item in the product GUI 14 or may be activated in any other suitable manner within the product GU1 14. The record function 18 may be provided as an installable plug-in, as part of the product 12 itself, via a separate program running in parallel with the product 12, or in any other suitable manner.

As the experienced user 10 moves through a set of GUI interactions 20 via the product GUI 14 of the product 12 to perform a particular task and/or to achieve a particular goal, the record function 18 records the GUI interactions 20. For example, each GUI item (e.g., menu item) pressed, selected, or otherwise actuated by the experienced user 10, as well as any associated information entered by the experienced user 10 (e.g., in a data field or other input field) in the product GUI 14, comprises a GUI interaction 20 that is recorded by the record function 18.

In embodiments, the GUI interactions 20 are recorded using a series of unique identifiers and sequence numbers. For example, the unique identifier may be based upon an internal unique identifier assigned by the product GUI 14 to a given GUI item, field, or other GUI component.

In a simplified case, for an illustrative 'File' menu 30 (see FIG. 2) containing the GUI items 'New' 32, 'Open' 34, 'Save' 36, and 'Print' 38, the corresponding unique identifiers assigned to each of these GUI items may comprise, for example:
File→ID1;
New→ID2;
Open→ID3;
Save→ID4; and
Print→ID5.

Figure 2:
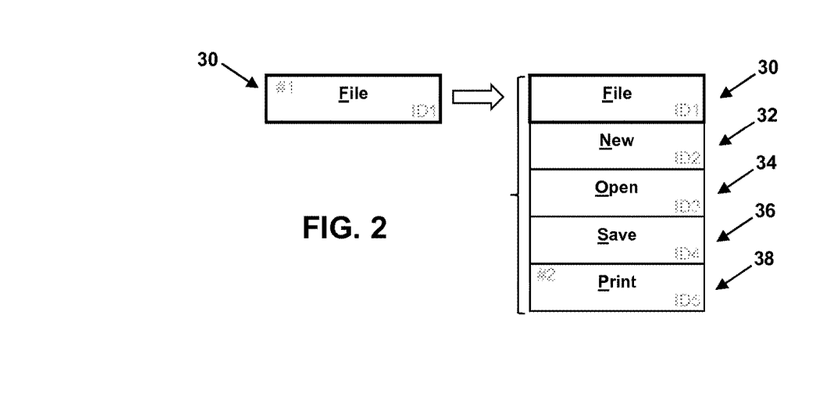
FIG. 2 depicts a set of GUI items, according to embodiments.

If the experienced user 10 wishes to record the steps needed to print a file in the product GUI 14, they would first select the record function 18. Then, as the experienced user 10 proceeds through the GUI interactions 20 of the product GUI 14 to print a document, they would first select (sequence #1) the File menu 30 (ID1) and then select (sequence #2) the Print command (ID5) from the File menu 30. To this extent, the following data would be recorded by the record function 18:
1, ID1; and
2, ID5.
That is, as the experienced user 10 selects the GUI interactions 20 File→Print in the product GUI 14, the record function 18 records the unique ID for File (ID1) with sequence #1 and then the unique ID for Print (ID5) with sequence #2.

Upon completing the goal of recording the process of printing a file in the product GUI 14, the experienced user 10 deselects the record function 18. The record function 18 outputs a set of sharable context-based instructions 16 containing the recorded GUI interactions 20 in a machine readable file 22. In embodiments, the file 22 may comprise an extensible markup language (XML) file. In addition to XML, the machine readable file 22 may comprise, for example, JavaScript Object Notation (JSON). The file 22 may then be exported and stored and/or shared for later use. The experienced user 10, or other users, may generate a plurality of different files 22, each directed to achieving a particular task and/or goal within the product 12 or other products. A library 40 of sharable files 22 can thus be established and shared among users. The files 22 may also be disseminated via email, instant messaging, social media sites, user groups, company websites, and/or the like.

An example of an XML structure in a file 22 that could be used to drive the recorded GUI interactions 20 for the creation and running of a default queue manger in WebSphere MQ is provided below:

```
<recordedSteps>
<recordedSteps sequence ="1" guiaction= "crtqmgr">
</recordedSteps>
<text> initiate queue manager creation </text>
<recordedSteps sequence = "2" guiaction= "defaultqmgr">
</recordedSteps>
<text>set qmgr status to default</text>
<recordedSteps sequence ="3" guiaction="setportnumber" portnumber= "1414">
</recordedSteps>
<text>setting qmgr port number<text>
<recordedSteps sequence="4" guiaction="startmqm">
<text>start qmgr<text>
</recordedSteps>
```

In this example, each recorded GUI interaction 20 is provided between the tags '<recordedSteps>' and '</recordedSteps>'. The sequence number of a recorded GUI interaction 20 is identified using the following type of structure '<recordedSteps sequence="1" guiaction="crtqmgr">'. This example is for illustration only, and is not intended to be limiting in any manner. Other file types and file structures may be used to implement the file 22.

As depicted in FIG. 1, a user 40 (e.g., a novice user), who may not be familiar with the use of the product 12 and the product GUI 14, selects an import function 42 in order to import a machine readable file 22 provided by the experienced user 10 and stored in the library 40. As with the record function 18, the import function 42 may be presented as a menu item in the product GUI 14 or may be activated in any other suitable manner within the product GU1 14. The import function 42 may be provided as an installable plug-in, as part of the product 12 itself, via a separate program running in parallel with the product 12, or in any other suitable manner.

The import function 42 parses the file 22 (e.g., using an XML or JSON parser with an XML or JSON file structure, respectively) to extract the sequence of GUI interactions 20 that are associated with a task the novice user 40 would like help in performing. Continuing the above example, the file 22 comprises the steps for printing a document, and the import function 42 extracts the following sequence of GUI interactions 20 from the file 22:
1, ID1; and
2, ID5.

After parsing the file, the import function 42 prompts the user 40 to continue. A highlighting function 44 is provided for guiding the user 40 through the GUI interactions 20 extracted from the file 22. As with the record function 18 and import function 42 described above, the highlighting function may be provided as an installable plug-in, as part of the product 12 itself, via a separate program running in parallel with the product 12, or in any other suitable manner.

Figure 3:
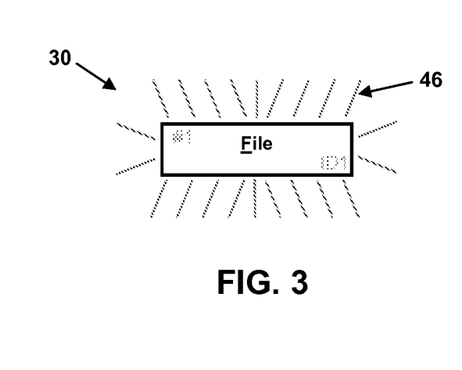
FIGS. 3-5 depict the highlighting of GUI items, according to embodiments.
Figure 4:
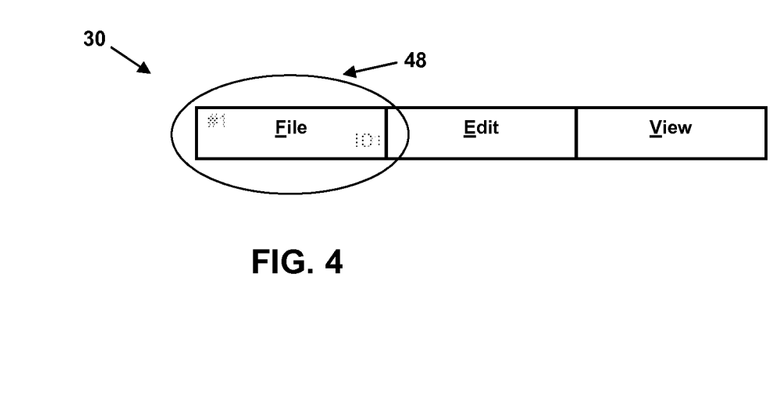
Figure 5:
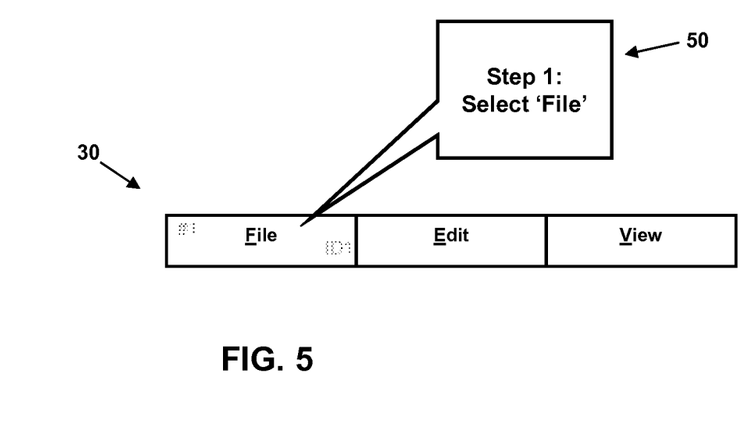

In the above example, as depicted in FIG. 3, the highlighting function 44 reads the first GUI interaction 20 in the sequence, namely 1, ID1, and then highlights 46 the GUI item (File menu 30) in the product GUI 14 having the unique identifier ID1. In embodiments, a GUI item in the product GUI 14 may be highlighted by changing the appearance of the GUI item. For example, the color of the GUI item may be changed to a bright color (e.g., yellow, orange, pink, etc.) to draw the attention of the user 44. The appearance of the GUI item may also be altered using animation (e.g., blinking), size changes, text changes (e.g., bolding), and/or the like. As depicted in FIG. 4, a GUI item may also be highlighted by enclosing the GUI item within a border 48. In other embodiments, as depicted in FIG. 5, a note/comment 50 including a description of a GUI interaction 20 may be displayed. In general, any methodology or combination of methodologies for changing, enhancing, or otherwise highlighting the appearance of a GUI item may be used.

Figure 6:
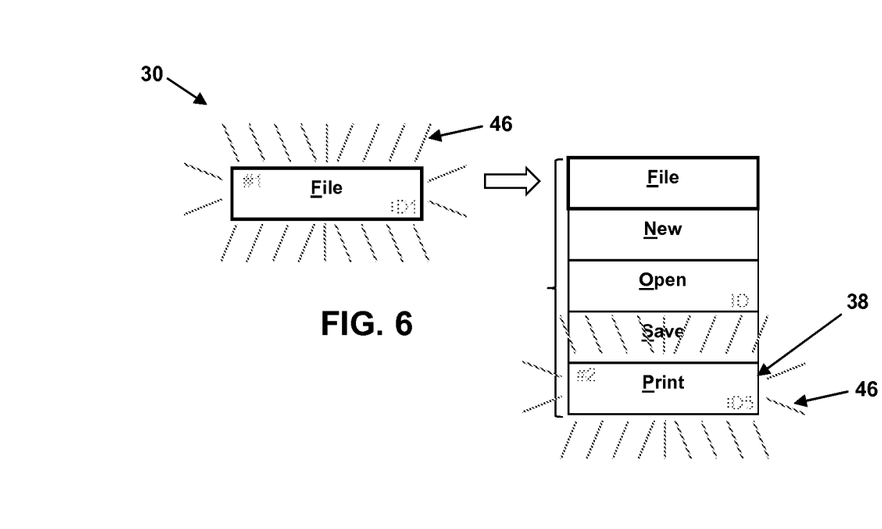
FIG. 6 depicts the sequential highlighting of GUI items, according to embodiments.

The user 40, upon seeing that a GUI item (e.g., File menu 30) has been highlighted in the product GUI 14, selects the highlighted GUI item. In the above example, as shown in FIG. 6, the selection of the highlighted File menu 30 GUI item results in the display of the GUI items 'New' 32, 'Open' 34, 'Save' 36, and 'Print' 38. The highlighting function 44 subsequently reads the next GUI interaction 20 in the sequence, namely 2, ID5, and highlights 46 the GUI item (Print command 38) in the product GUI 14 having the unique identifier ID5. The user 40 may then select the highlighted GUI item (Print command 38) to select and print a document.

Another use case is described below. A flow diagram depicting the general steps in a corresponding process according to embodiments is provided in FIG. 7.

In this example, an experienced user wishes to create a cluster in WebSphere MQ. The experienced user believes that this activity is something which others will want to do with WebSphere MQ as well.

Figure 7:
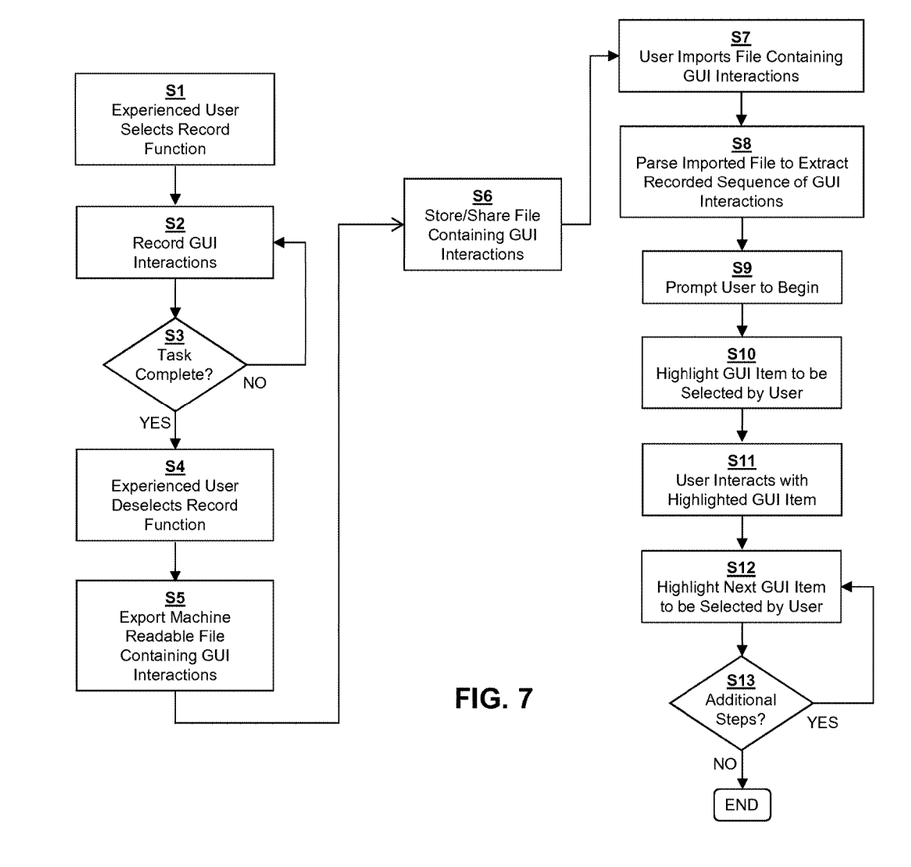
FIG. 7 depicts an illustrative flow diagram, according to embodiments.

At process S1, the experienced user selects the record function while working in WebSphere MQ and begins the task of creating a cluster. At process S2, as the experienced user uses the GUI items in the product GUI to achieve the task (i.e., creation of a cluster), each GUI interaction is recorded in sequence along with any values entered or associated with the GUI interaction. For example, to create a cluster, the experienced user selects the 'define queue manager' button and then enters the name of the queue manager.

At process S3, if the experienced user has competed the task of creating a cluster (YES, S3), flow passes to process S4. Otherwise (NO, S3), the recording of GUI interactions continues in process S2 until the task has been completed. At process S4, the experienced user deselects the record function. At process S5, a set of sharable context-based instructions containing the recorded sequence of GUI interactions in a machine readable file (e.g., XML file) are exported. At process S6, the file is stored in a library or otherwise made available for sharing for access by other users.

At process S7, another user who wishes to learn how to create a cluster in WebSphere MQ imports the corresponding file of GUI interactions into the WebSphere MQ product GUI. At process S8, the file is parsed to extract the recorded sequence of GUI interactions.

At process S9, the product GUI prompts the user to begin the process associated with the file. At process S10, after the user indicates that he/she is ready to begin, the product GUI highlights the first GUI item to be selected by the user and provides any inputted value recorded by the experienced user. At process S11, the user completes the interaction with the highlighted GUI item.

At process S12, the product GUI highlights the next GUI item to be selected by the user in order to achieve the task associated with the file. The highlighting continues (YES, S13) for each additional GUI interaction in the recorded sequence of GUI interactions until the task is complete (NO, S13), at which point the process ends.

The present disclosure provides a learning device that allows experienced users to share best practices with new users. It is not a macro playback tool that can automate steps. Rather, it allows a user to follow instructions directly in a GUI in a natural way—rather than abstract and interpret them from a video or error prone text instructions. The disclosure defines an XML (or other machine readable) representation of the steps needed to complete a task within a GUI, which can be easily shared across social media and between groups. It also allows the steps to be amended to fit around given organizational policies, without having to completely reconstruct the instructions from scratch (as is the case with video). Also, as the instructions may be formatted in XML they can be easily shared via social media, without the need for hefty downloads of video or hard to follow text instructions. Beyond this, the present invention may be applied to product support as well as peer to peer/expert sharing. For example, rather than a user attempting to explain to support personnel what they have done in a product which led to a problem, they can simply export out a recording of their steps and this can then be quickly replicated in a support environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 8:
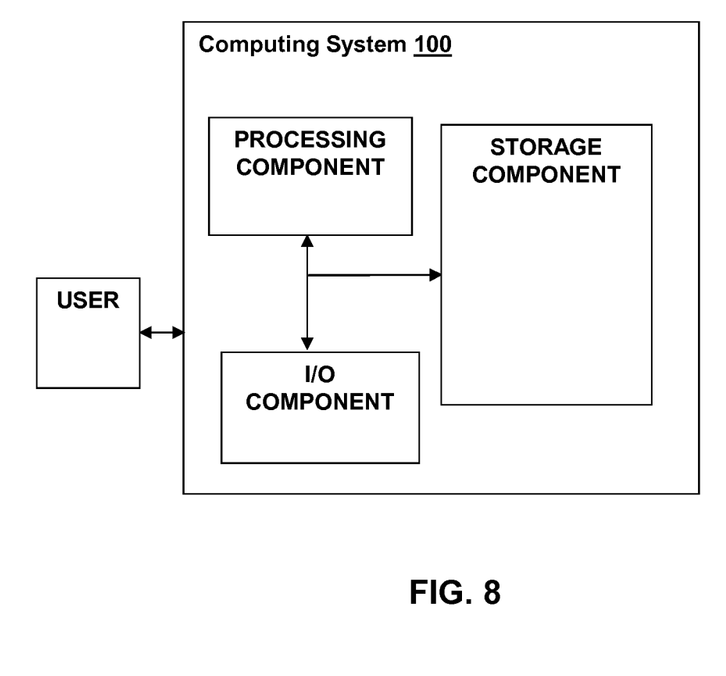
FIG. 8 depicts an illustrative computing system, according to embodiments.

FIG. 8 depicts an illustrative computing system 100 for implementing the present invention, according to embodiments. The computing system 10 may comprise any type of computing device and, and for example includes at least one processor, memory, an input/output (I/O) (e.g., one or more I/O interfaces and/or devices), and a communications pathway. In general, processor(s) execute program code for implementing one or more systems/functions of the present invention, which is at least partially fixed in memory. While executing program code, processor(s) can process data, which can result in reading and/or writing transformed data from/to memory and/or I/O for further processing. The pathway provides a communications link between each of the components in computing system 100. I/O can comprise one or more human I/O devices, which enable a user to interact with computing system 100.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A method, comprising:
a recording process, including:
recording a set of sequential graphical user interface (GUI) interactions for performing and completing an entire task in a product GUI, each sequential GUI interaction having a unique identifier and a sequence number, the recording including recording the unique identifier and the sequence number for each GUI interaction in the set of sequential GUI interactions to provide a series of the unique identifiers and the sequence numbers corresponding to the set of sequential GUI interactions for performing and completing the entire task; and saving the series of the unique identifiers and the sequence numbers corresponding to the set of sequential GUI interactions for performing and completing the entire task in a file; and an interactive user process for performing the task after completion of the recording process of recording the set of sequential GUI interactions for performing and completing the entire task and after saving the series of the unique identifiers and the sequence numbers corresponding to the set of sequential GUI interactions for performing and completing the entire task in the file, including: importing the file containing the series of the unique identifiers and the sequence numbers corresponding to the set of sequential GUI interactions for performing and completing the entire task;

parsing the file to extract the set of sequential GUI interactions for performing and completing the entire task from the series of the unique identifiers and the sequence numbers corresponding to the set of sequential GUI interactions;

highlighting, in the product GUI, a GUI interaction listed in the set of sequential GUI interactions for performing and completing the entire task; and in response to a user selection of the highlighted GUI interaction, highlighting, in the product GUI, a next sequential GUI interaction listed in the set of sequential GUI interactions for performing and completing the entire task, wherein the entire task is fully performed by the user after all of the GUI interactions listed in the set of sequential GUI interactions have been highlighted and subsequently selected by the user during the interactive user process.

2. The method of claim 1, the recording process further comprising:
selecting a record function to record the set of sequential GUI interactions in the product GUI.

3. The method of claim 2, wherein the record function is selected during the recording process by a first user who is familiar with the product GUI, and wherein the file containing the set of sequential GUI interactions is imported during the interactive user process by a second user who is less familiar than the first user with the product GUI.

4. The method of claim 1, wherein saving the set of sequential GUI interactions in a file during the recording process further comprises at least one of:
storing the file in a library of files; and
sharing the file with a plurality of users.

5. The method of claim 1, wherein the file comprises an extensible markup language (XML) file.

6. A computer program product comprising program code embodied in at least one computer-readable storage medium, which when executed, enables a computer system to implement a method, the method comprising:
a recording process, including:
recording a set of sequential graphical user interface (GUI) interactions for performing and completing an entire task in a product GUI, each sequential GUI interaction having a unique identifier and a sequence number, the recording including recording the unique identifier and the sequence number for each GUI interaction in the set of sequential GUI interactions to provide a series of the unique identifiers and the sequence numbers corresponding to the set of sequential GUI interactions for performing and completing the entire task; and saving the series of the unique identifiers and the sequence numbers corresponding to the set of sequential GUI interactions for performing and completing the entire task in a file; and an interactive user process for performing the entire task after completion of the recording process of recording the set of sequential GUI interactions for performing and completing the entire task and after saving the series of the unique identifiers and the sequence numbers corresponding to the set of sequential GUI interactions for performing and completing the entire task in the file, including:

importing the file containing the series of the unique identifiers and the sequence numbers corresponding to the set of sequential GUI interactions for performing and completing the entire task;

parsing the file to extract the set of sequential GUI interactions for performing and completing the entire task from the series of the unique identifiers and the sequence numbers corresponding to the set of sequential GUI interactions;

highlighting, in the product GUI, a GUI interaction listed in the set of sequential GUI interactions for performing and completing the entire task; and in response to a user selection of the highlighted GUI interaction, highlighting, in the product GUI, a next sequential GUI interaction listed in the set of sequential GUI interactions for performing and completing the entire task, wherein the entire task is fully performed by the user after all of the GUI interactions listed in the set of sequential GUI interactions have been highlighted and subsequently selected by the user during the interactive user process.

7. The computer program product of claim 6, the recording process further comprising:
selecting a record function to record the set of sequential GUI interactions in the product GUI.

8. The computer program product of claim 7, wherein the record function is selected during the recording process by a first user who is familiar with the product GUI, and wherein the file containing the set of sequential GUI interactions is imported during the interactive user process by a second user who is less familiar than the first user with the product GUI.

9. The computer program product of claim 6, wherein saving the set of sequential GUI interactions in a file during the recording process further comprises at least one of:
storing the file in a library of files; and
sharing the file with a plurality of users.

10. The computer program product of claim 6, wherein the file comprises an extensible markup language (XML) file.

* * * * *